(12) United States Patent
Rhoads et al.

(10) Patent No.: US 9,008,192 B2
(45) Date of Patent: Apr. 14, 2015

(54) ARRANGEMENTS FOR INCREASING DETECTION CONFIDENCE

(75) Inventors: Geoffrey B. Rhoads, West Linn, OR (US); John Stach, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 465 days.

(21) Appl. No.: 13/309,960

(22) Filed: Dec. 2, 2011

(65) Prior Publication Data

US 2013/0104010 A1 Apr. 25, 2013

Related U.S. Application Data

(60) Provisional application No. 61/549,506, filed on Oct. 20, 2011, provisional application No. 61/550,805, filed on Oct. 24, 2011.

(51) Int. Cl.
*H04N 7/64* (2006.01)
*G06K 9/68* (2006.01)
*H04N 7/22* (2006.01)

(52) U.S. Cl.
CPC ........ *G06K 9/685* (2013.01); *G06K 2009/6871* (2013.01)

(58) Field of Classification Search
None
See application file for complete search history.

(56) References Cited

U.S. PATENT DOCUMENTS

| 5,933,546 | A | 8/1999 | Stone |
| 6,125,194 | A | 9/2000 | Yeh et al. |
| 6,711,293 | B1* | 3/2004 | Lowe ............................ 382/219 |
| 7,095,874 | B2 | 8/2006 | Moskowitz et al. |
| 8,014,562 | B2 | 9/2011 | Rhoads et al. |
| 2001/0033681 | A1 | 10/2001 | Wang |
| 2003/0048922 | A1 | 3/2003 | Rhoads |
| 2006/0161984 | A1* | 7/2006 | Phillips et al. .................. 726/24 |
| 2009/0326962 | A1* | 12/2009 | Chen et al. ..................... 704/500 |

FOREIGN PATENT DOCUMENTS

WO WO2013059477 4/2013

OTHER PUBLICATIONS

International Search Report and Written Opinion of PCT/US12/060835 (published as WO2013/059477), mailed Dec. 17, 2012.

* cited by examiner

*Primary Examiner* — April Y Blair
*Assistant Examiner* — Dipakkumar Ghandhi
(74) *Attorney, Agent, or Firm* — Digimarc Corporation

(57) ABSTRACT

In one embodiment, a first set of digital data (e.g., an image) is tested for the presence of a certain feature (e.g., a certain face), yielding one of two outcomes (e.g., not-present, or present). If the testing yields the first outcome, no additional testing is performed. If, however, the testing yields the second outcome, further testing is performed to further check this outcome. Such further testing is performed on a second set of digital data that is based on, but different from, the first set of data. Only if the original testing and the further testing both yield the same second outcome is it treated as a valid result. A variety of other features and arrangements are also detailed.

22 Claims, 4 Drawing Sheets

ARRANGEMENTS FOR INCREASING DETECTION CONFIDENCE

RELATED APPLICATION DATA

This application claims priority benefit to provisional applications 61/549,506, filed Oct. 20, 2011, and 61/550,805, filed Oct. 24, 2011.

TECHNICAL FIELD

The present technology concerns content processing (e.g., of imagery, video and audio), and more particularly concerns determining whether a content object has a particular attribute.

INTRODUCTION AND SUMMARY

With the proliferation of computer-based devices, more and more decisions are being delegated to computers.

Some decisions are deterministic in nature, and, absent a hardware fault, the computer always provides the correct results (e.g., 2+2=4).

In contrast, some decisions are statistical in nature, e.g., with a computer determining that a certain condition is likely true or false, with a high degree of certainty.

In the latter cases, regardless of how high the degree of certainty, there will always be circumstances—albeit infrequently—in which the computer may be wrong. The consequences of wrong decisions can range from nil to enormous, depending on the application.

One probabilistic decision is facial recognition. Consider systems used to issue driver's licenses, which are concerned with a single individual obtaining multiple drivers licenses under different aliases. To combat such fraud, when a person applies for a license, the system checks the applicant's facial portrait against a database of facial portraits on all previously-issued licenses (commonly in an off-line process). If the applicant's face already seems to be on an issued driver's license, the applicant is called back for an investigative appointment.

Sometimes such systems find a match when there is none. In such case the applicant usually convinces the authorities that the earlier license was issued to a different person, and ultimately receives a driver's license. However, the time and inconvenience required can be considerable.

A related scenario concerns face-based searching for known terrorists, using imagery captured by surveillance cameras or otherwise. Here the consequences for incorrectly-identified persons can be much greater.

Another form of identification is digital watermarking, in which a digital representation of image, video or audio content is altered in subtle respects to encode a hidden data payload.

Digital watermark decoding is generally a deterministic operation—provided that the content presented for decoding has not been altered since its encoding. However, if the version of content from which a watermark is decoded is not identical to the content as originally-encoded, then the change may render the decoding a probabilistic exercise.

Consider a video-on-demand service that streams a recently-released movie to a subscriber's video playback device (e.g., settop box). The video stream may be encoded with a digital watermark that conveys a serial number of the subscriber's playback device. The settop box is programmed to disable playback of the movie if it decodes the digital watermark and finds none, or finds a value different than its own serial number. While normally a deterministic exercise, the decoded value may be a probabilistic function if the video stream has been compromised during its transmission (e.g., by dropped packets, compression/decompression, etc.). If the watermark is not correctly decoded, the subscriber may be denied access to a paid-for movie.

In the just-reviewed case, the problem of mis-detection can be redressed by checking several different excerpts of the video stream for the watermark, comparing the results, and considering "valid" any result that occurs two or more times. It is highly improbable that a watermark decoding error would recur twice within a single movie stream. However, such approach is not suitable for some applications, such as imagery—where there is no time dimension.

In accordance with one aspect of the present technology, a first set of digital data (e.g., an image) is tested for the presence of a certain feature (e.g., a certain face or watermark), yielding one of two outcomes (e.g., not-present, or present). If the testing yields the first outcome, no additional testing is performed. If, however, the testing yields the second outcome, further testing is performed to further check this outcome. Such further testing is performed on a second set of digital data, which is produced by applying an algorithmic corruption process to the first set of data. Only if the original testing and the further testing both yield the same second outcome is it treated as a valid result.

The foregoing and additional features and advantages of the technology will be more readily apparent from the following detailed description, which proceeds with reference to the accompanying drawings.

DETAILED DESCRIPTION

The present technology involves conducting a test twice, to yield higher confidence in the result. So-doing, however, potentially doubles the time and effort required for testing. Accordingly, re-testing is not performed all of the time, but instead is performed only when a certain outcome(s) is encountered. And the re-testing does not identically repeat the earlier testing. Instead, the second test processes a different set of data. If the second test yields the same outcome as the first test, the confirmed result is regarded is the final test outcome, with a high degree of confidence.

Figure 1:
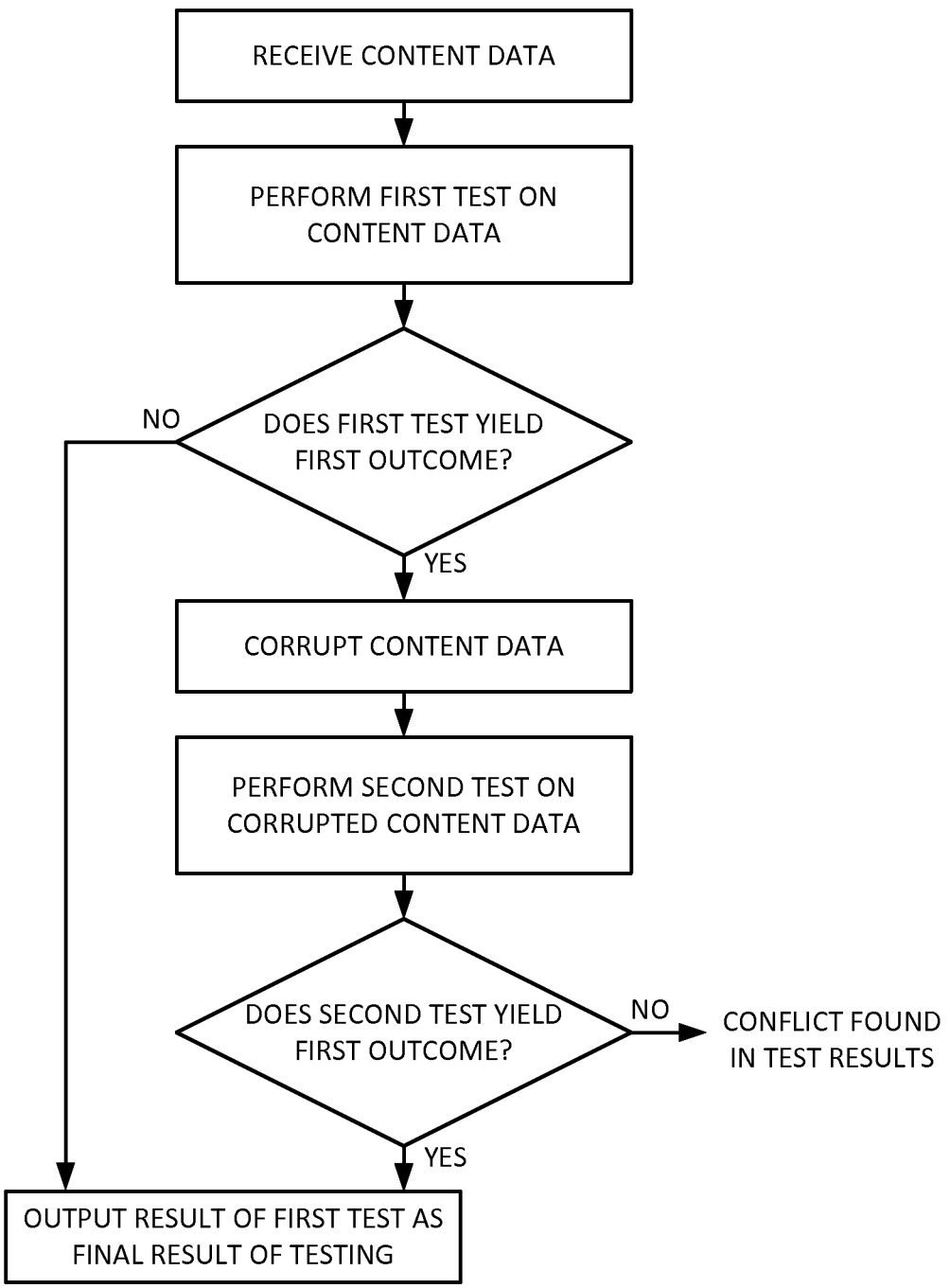
FIG. 1 is a flowchart detailing one particular embodiment employing certain features of the present technology.

FIG. 1 shows a process according to one aspect of the technology. Original content data is received. This data can represent audio, imagery, video, a 3D model, etc.

A first test is performed on the original content data. The first test can check, e.g., for the presence of a particular face in a picture, or watermark in an audio stream, etc., using conventional techniques.

The outcome of the first test may be taken, in many cases, as the final result. However, heightened confidence may be required for a finding of a particular first outcome. Accordingly, if the first test yields this first outcome, a further testing procedure is invoked.

In the FIG. 1 arrangement, this further testing procedure involves corrupting the content data that was originally tested. A second test is performed on the corrupted data, and the result is then checked for a re-occurrence of the first outcome.

If the first outcome recurs, it is treated as the final result of the testing—with a commensurately high degree of confidence. If, in contrast, the re-testing does not again yield the first outcome, then the first and second tests conflict. Additional testing can be performed to resolve the conflict, or other action can be taken.

The second test is typically the same as the first, and is often performed by the same hardware module as performed the first test. (The hardware module may be purpose-specific electronic circuitry, but more commonly is a general purpose processor that is configured by software instructions to perform a certain testing procedure.)

In some embodiments, however, the second test may be different. For example, in facial recognition, the testing module that is used for re-testing may analyze the input imagery using different algorithms to discern facial geometry (e.g., the distance between the eye pupils, the distance between the tip of nose and middle of mouth, etc.). Thus, the second test needn't always perform the same process as the first test.

In FIG. 1, the second test is performed with corrupted data. Corruption can take various forms. Desirably, such corruption does not destroy the perceptual character of the content represented by the data. (An image of a dog should still look, to human viewers, like an image of a dog; Beethoven's Fifth Symphony should still sound, to human listeners, like Beethoven's Fifth Symphony, etc.) Rather, the corruption is in the particular pixel, sample, transform-domain coefficient, or other values that are tested by the testing module.

One form of corruption is JPEG compression/decompression. Such image processing performs compression by discarding image features that are beyond the ability of humans to perceive from typical viewing distances (e.g., 12 inches). Likewise with MP3 compression, which removes audio signal features that are too insignificant to be audible to humans. By submitting a different set of data for re-testing—even a set which may be perceptually identical to human audiences, a different outcome may be obtained.

Another form of corruption is rotation of imagery. An image of a dog should still be recognized as depicting the dog if it is rotated, e.g., 0.1, 1 or 10 degrees. Yet the computer analysis may yield different results with the different (i.e., corrupted) set of data than with the originally-analyzed set of data. If both tests agree, this is strong evidence that the twice-determined outcome is correct.

Another form of corruption is re-sampling. An original set of imagery (still, or video) may comprise data representing an array of pixels having dimensions of 100 rows by 100 columns. Such imagery may be re-sampled to yield a set of pixels having dimensions of 80×80 pixels, or 110×110 pixels, etc. (The most common resampling algorithms are bilinear, bicubic, and nearest-neighbor techniques.) Again, processing this different set of data may cause the testing module to reach a different outcome. If it does not, this increases confidence that the original result was correct. (Resampling can also be applied to audio data.)

Many testing modules work on content data represented in Fourier space. Known transforms take a set of audio sample data or image pixel data, and produce a set of corresponding frequency domain (or spatial-frequency domain) coefficients. For imagery, the transforms commonly operate on block-based data, e.g., square groupings of pixels having dimensions of 8×8, or 32×32 pixels. For audio, the transforms commonly operate on a block of consecutive audio samples (e.g., 1024).

One way that content can be corrupted is by changing the boundaries of blocked data analyzed by the testing module.

Figure 2:
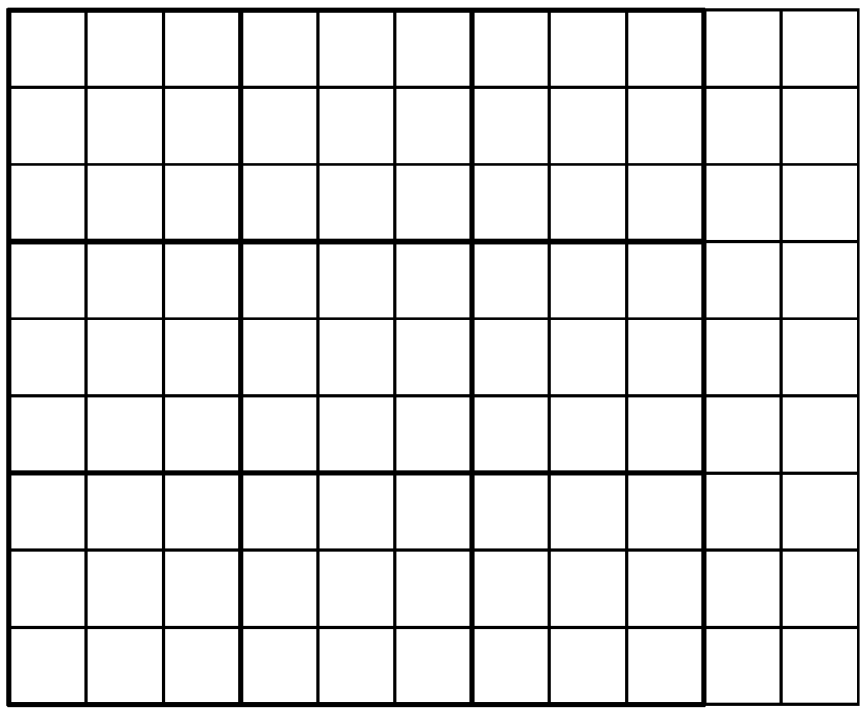
FIGS. 2 and 3 show how an image can be re-blocked for re-testing.

Consider FIG. 2, which shows an image comprising a 9×11 array of pixels. Normally, such image may be blocked by starting in the upper left corner, and tiling adjacent blocks across and down the image. Here the blocks are 3×3 pixels in size, as shown by dark lines. (If, at an edge of the image, there are not enough pixels to complete a 3×3 block, such pixels are not considered in the Fourier-based analysis.)

Figure 3:
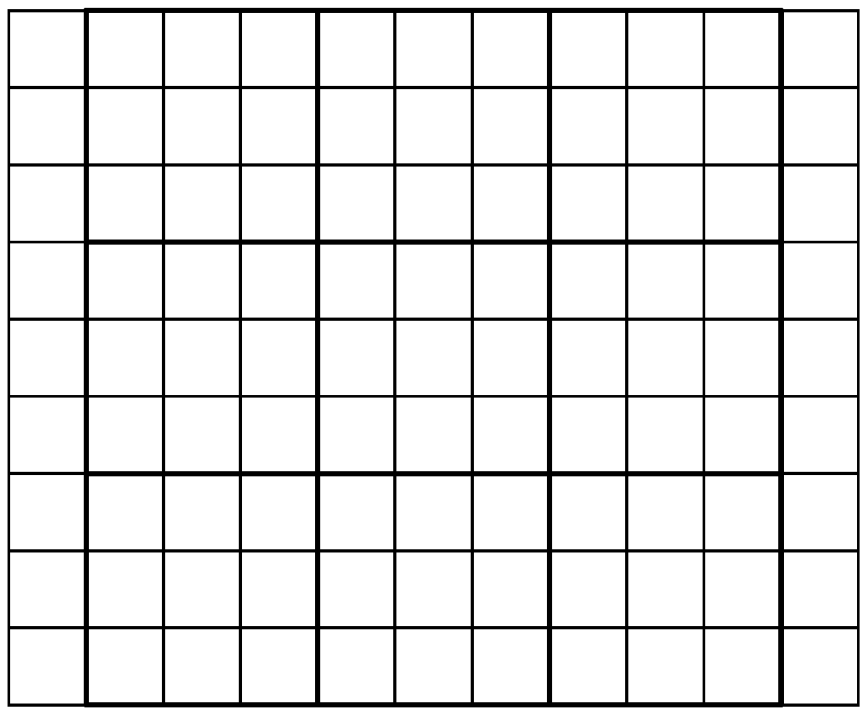

The first test of FIG. 1 may be applied to the imagery as blocked in FIG. 2. The second test of FIG. 1 may be applied to the imagery as blocked in FIG. 3. Again, the testing module is processing different data, which may cause it to produce a different result. if both tests yield the same outcome, this outcome is known with higher certainty.

Figure 4:
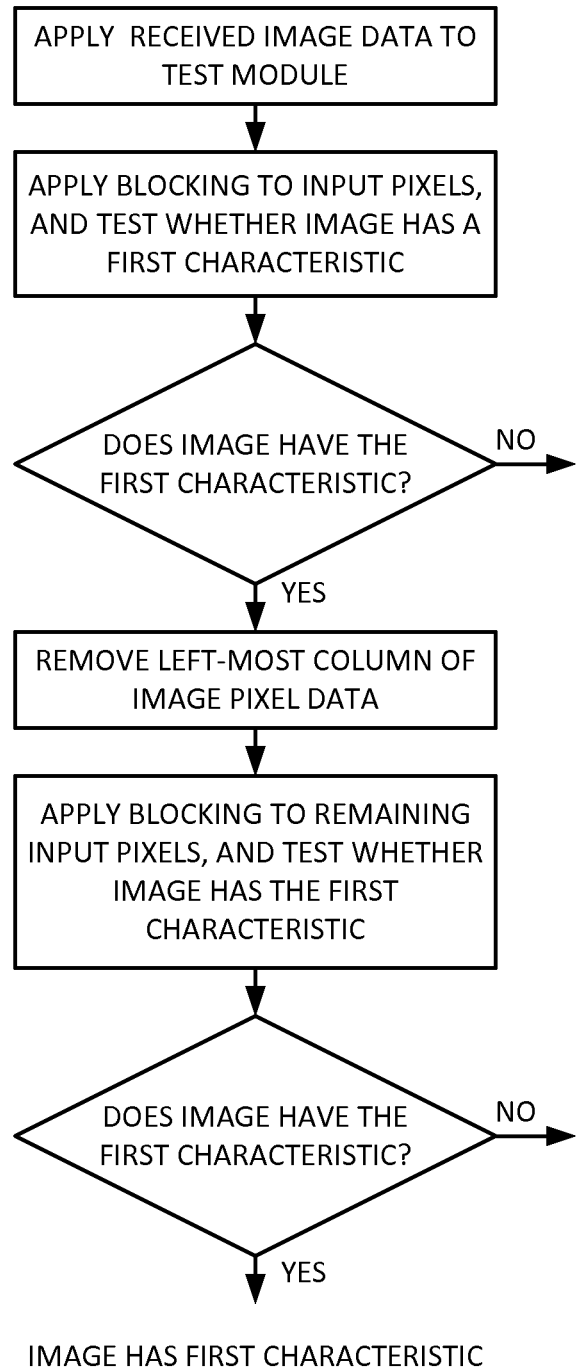
FIG. 4 is a flowchart detailing another particular embodiment employing certain features of the present technology.

One particular implementation of this example is shown in FIG. 4. Here, received image data is provided to a test module. The test module blocks the image into blocks of pixels (e.g., 8×8 blocks, starting at the upper left pixel), and checks whether the image has a first character (e.g., that it contains a digital watermark).

If the image has such a feature, the left-most column of image pixel data is removed. The remaining input pixels are re-blocked, and testing is re-applied. The outcome is again checked.

It will be recognized that the removal of the left column of pixels causes the groupings of pixels making up each block to change, which may cause the result found by the testing module to change. If it does not, this indicates—with increased confidence—that the original test result was correct.

Another form of corruption is to omit, or alter, coefficients that represent the content in a transform domain.

Other Remarks

Having described and illustrated the principles of our work with reference to a few examples, it should be recognized that the technology is not so limited.

For example, aspects of the different embodiments can readily be changed and substituted. (E.g., discarding or re-blocking of data can be applied in audio embodiments, rather than the image embodiments particularly detailed.)

Similarly, while described in the context of testing by facial recognition and digital watermark decoding operations, the present technology can be used with all manner of content testing. One other form of content testing is pattern recognition, such as by techniques including SIFT, SURF and ORB (sometimes called image fingerprinting).

Some implementations can alter the data presented to the testing module by simply reading stored content from different starting locations in memory (e.g., read data starting at location N for the first test, and starting at location N+1 for the second test). Or the same result might be achieved by reading from a fixed position in a buffer through which the data moves over time.

Thus it will be recognized that, in some implementations, the "corruption" does not involve any alteration to any data values, but simply changes the groupings or other manner by which the data values are submitted for analysis.

Instead of corrupting the input content data, the technology can also be practiced by corrupting intermediate parameters determined by the testing module. For example, the assignee's image watermarking technology first looks for a calibration signal embedded in the image data, and, by reference to this calibration signal, discerns the scale, rotation, and translation of the imagery (as compared with the originally-encoded content). After this first stage of processing has been completed, a second stage of processing uses these intermediate parameters to analyze the input imagery to extract a digital watermark.

Figure 5:
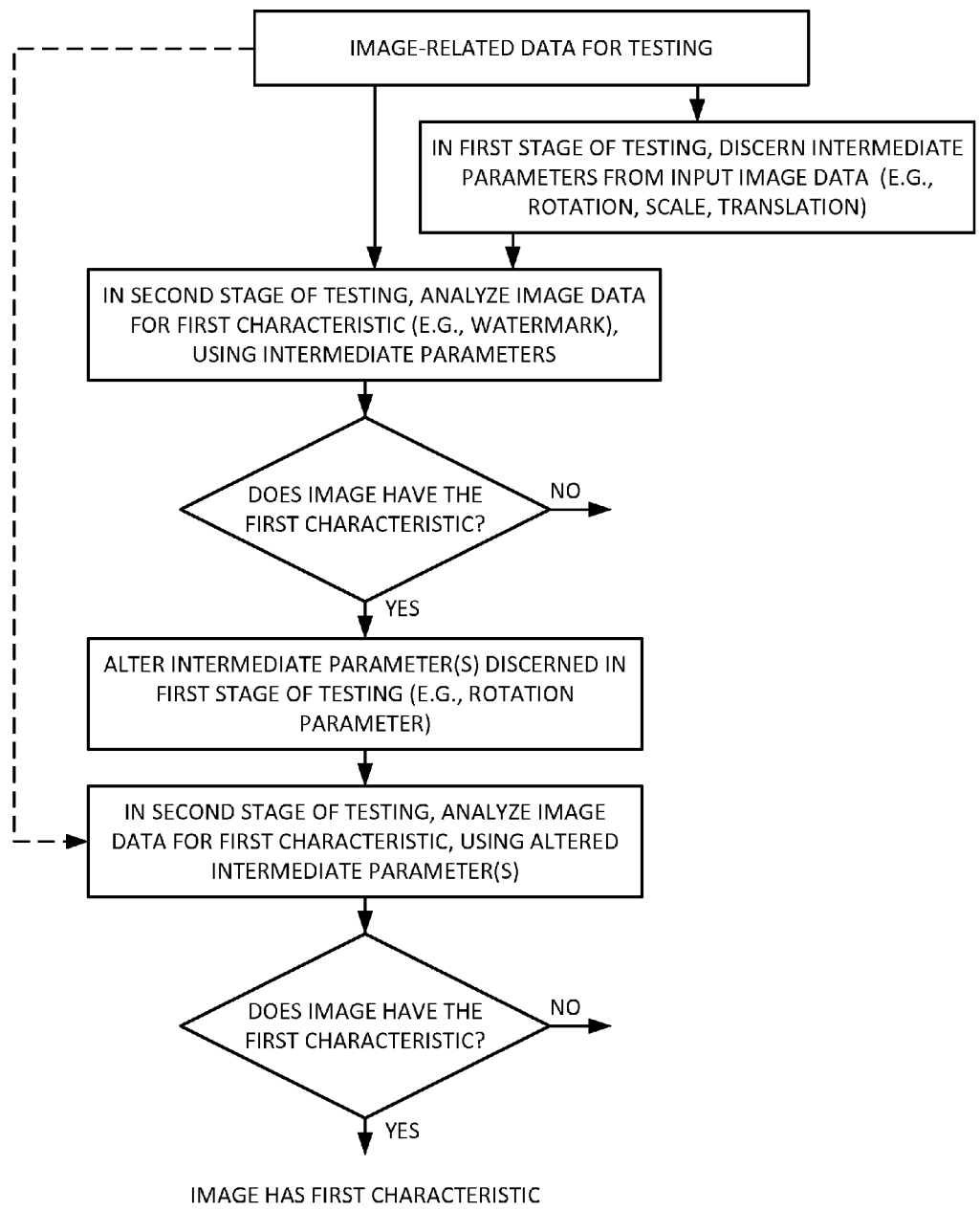
FIG. 5 is a flowchart detailing yet another particular embodiment employing certain features of the present technology.

In this variant arrangement (illustrated in FIG. 5), during the re-test operation, one or more of the parameters discerned in the first stage processing (e.g., rotation) is altered slightly (e.g., by 0.2 degrees). The testing module then repeats the second stage of processing on the original set of image data, but using the altered rotation value. Again, if the same result is found, this is additional evidence that such result is correct.

(The just-discussed arrangement may simply be viewed as another form of corrupting the input content data, where the input content data includes the intermediate set of parameters.)

It will be recognized that the just-described arrangement provides some computational efficiency over the embodiments discussed earlier, in that the re-test operation does not repeat the entire earlier analysis again. Instead, it takes a parameter earlier-determined, and perturbs it slightly, short-cutting the analysis the second time.

Other embodiments can also often employ shortcuts to reduce the time or complexity of the re-test operation. For example, in the FIG. 4 embodiment, in which the left column of image pixels is discarded and the remaining imagery is re-blocked, many of the elemental acts involved in the FFT analysis still repeat (e.g., certain multiplications). The technology may be implemented so that results from such elemental acts are read from memory, rather than re-computed, so as to speed the re-testing operation. Similarly in other embodiments—where the same operations are performed on the same data in both the first and second tests, data resulting from such operations may be stored during the first test, and recalled if the second test is performed.

The detailed technology can be implemented in various types of hardware, including smartphones, desktop computers, tablet computers, printers, scanners, set top boxes, music players, etc.

The design of such hardware devices is familiar to the artisan. Each typically includes one or more processors, one or more memories (e.g. RAM), storage (e.g., a disk or flash memory), interconnections between these elements (e.g., buses), and an interface for communicating with other devices (by wireless or wired).

The detailed processes and arrangements may be implemented as instructions for computing devices, including general purpose processor instructions for a variety of programmable processors, including microprocessors (e.g., the Atom and A4), graphics processing units (GPUs, such as the nVidia Tegra APX 2600), and digital signal processors (e.g., the Texas Instruments TMS320 series devices), etc. These instructions may be implemented as software, firmware, etc. Execution of the instructions can be distributed among processors and/or made parallel across processors within a device or across a network of devices. Processing of data may also be distributed among different processor and memory devices. "Cloud" computing resources can be used as well. References to "processors," or "modules" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc.

While this disclosure has detailed particular ordering of acts and particular combinations of elements, it will be recognized that other contemplated methods may re-order acts (possibly omitting some and adding others), and other contemplated combinations may omit some elements and add others, etc.

While this specification has focused on particular methods of testing, it will be recognized that corresponding apparatuses for performing such methods also fall within the scope of the present technology. So, too, do computer readable media containing software for programming devices to perform the detailed methods.

Exemplary digital watermarking techniques are taught in the assignee's patent documents U.S. Pat. No. 6,590,996 and 20100150434.

Examples of image fingerprinting are detailed in patent publications 20050004941, 20050108242, 20060041753, 20060075237, 20060218126, 20070071330 (Philips) and 20070250716 (Digimarc). Examples of audio fingerprinting are detailed in patent publications 20070250716, 20070174059 and 20080300011 (Digimarc), and U.S. Pat. Nos. 6,990,453 and 7,359,889 (Shazam).

Reference has been made to SIFT, SURF, and ORB feature recognition techniques. SIFT (Scale-Invariant Feature Transform) is detailed in Lowe, "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

SURF is detailed in Bay et al, "SURF: Speeded Up Robust Features," Eur. Conf. on Computer Vision (1), pp. 404-417, 2006; as well as Chen et al, "Efficient Extraction of Robust Image Features on Mobile Devices," Proc. of the 6th IEEE and ACM Int. Symp. on Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008.

ORB is detailed, e.g., in Calonder et al, "BRIEF: Computing a Local Binary Descriptor Very Fast," EPFL Computer Vision Laboratory Technical Report 2011 (to appear in IEEE Transactions on Pattern Analysis and Machine intelligence); Calonder, et al, "BRIEF: Binary Robust Independent Elementary Features," ECCV 2010; and Rublee et al, "ORB: an efficient alternative to SIFT or SURF," ICCV 2011.

SIFT, SURF and ORB are each implemented in the popular OpenCV software library (e.g., version 2.3.1).

To provide a comprehensive disclosure, while complying with the 35 USC Section 112 mandate of conciseness, applicants incorporate-by-reference the patent and other documents referenced herein. Such materials are incorporated in their entireties, even if cited above in connection with specific of their teachings. These references disclose technologies and teachings that applicant intends be incorporated into the arrangements detailed herein, and into which the technologies and teachings detailed herein be incorporated.

In view of the wide variety of embodiments to which the principles and features discussed above can be applied, it should be apparent that the detailed embodiments are illustrative only, and should not be taken as limiting the scope of the invention. Rather, we claim as my invention all such modifications as may come within the scope and spirit of the following claims and equivalents thereof.

We claim:

1. A method comprising:

receiving content data;

performing a first test on the content data to detect the presence of a first feature;

only after detecting the presence of the first feature by said first test, performing a second test to confirm the presence of the first feature;

wherein the method further includes:

corrupting the content data using a hardware device configured to perform such act; and performing the second test on the corrupted content data to confirm the presence of the first feature.

2. The method of claim 1 in which the first and second tests comprise the same test.

3. The method of claim 1 in which the content data comprises audio samples, and the corrupting comprises discarding or altering one or more of said samples.

4. The method of claim 1 in which the content data comprises coefficients representing audio in a frequency domain, and the corrupting comprises discarding or altering one or more of said coefficients.

5. The method of claim 1 in which the content data comprises audio data, and the corrupting comprises resampling said audio data.

6. The method of claim 1 in which the content data comprises audio data, and the first test comprises a digital watermark decoding process.

7. The method of claim 1 in which the content data comprises audio data, and the first test comprises a pattern recognition process.

8. The method of claim 1 in which the content data comprises image data representing rows and columns of pixel data, and the corrupting comprises discarding or altering data representing one or more of said rows and/or columns.

9. The method of claim 1 in which the content data comprises coefficients representing imagery in a spatial frequency domain, and the corrupting comprises discarding or altering one or more of said coefficients.

10. The method of claim 1 in which the content data comprises image data, and the corrupting comprises virtually rotating the image data.

11. The method of claim 1 in which the content data comprises image data, and the corrupting comprises resampling the image data.

12. The method of claim 1 in which the content data comprises image data, and the first test comprises a digital watermark decoding process.

13. The method of claim 1 in which the content data comprises image data, and the first test comprises a pattern recognition process.

14. A method comprising:

(a) conducting a testing process by applying a first set of data to a testing module, the first set of data representing image, audio or video content, the testing module outputting data indicating a testing outcome;

(b) in response to the testing process outputting data indicating a first testing outcome, conducting a re-testing process by repeating act (a) using a second set of data representing said content, the second set of data being derived from the first set;

(c) in response to the re-testing process again outputting data indicating said first testing outcome, outputting a signal indicating the first testing outcome as a final outcome.

15. The method of claim 14 in which the testing module performs an object recognition operation.

16. The method of claim 14 in which the testing module performs a digital watermark decoding operation.

17. The method of claim 14 in which (b) comprises altering the first set of data to yield the second set of data.

18. The method of claim 17 in which the altering comprises omitting one or more elements of the first set of data to yield the second set of data.

19. The method of claim 17 in which the content comprises data representing plural blocks of image data, each block including a grouping of plural pixels, and the altering comprises changing a grouping of plural pixels in one or more of said blocks.

20. A method comprising:

receiving content data;

performing initial processing on the content data, yielding intermediate data;

performing a test to detect the presence of a feature in the content data, the test using the intermediate data;

altering the intermediate data, yielding altered intermediate data; and repeating the test using the altered intermediate data to confirm the presence of said feature.

21. The method of claim 20 that includes performing said repeating act only if the test detected the presence of said feature in the content data.

22. The method of claim 20, wherein performing initial processing on the content data, yielding intermediate data includes discerning intermediate data within the content data.

* * * * *